June 10, 1969  K. L. HULSING  3,448,664
FLOATING CROWN PISTON
Filed Oct. 25, 1967

INVENTOR.
Kenneth L. Hulsing
BY
S.C. Tharpe
ATTORNEY 3,448,664
FLOATING CROWN PISTON
Kenneth L. Hulsing, Plymouth, Mich., assignor to General Motors Corporation, Detroit, Mich., a corporation of Delaware
Filed Oct. 25, 1967, Ser. No. 677,970
Int. Cl. F01b *31/10;* F16j *1/14*
U.S. Cl. 92—157                                    7 Claims

ABSTRACT OF THE DISCLOSURE

A piston, connecting rod and wrist pin assembly in which the piston has its crown and ring belt separate from the piston skirt, the two parts of the piston and the connecting rod being retained in assembly by part-cylindrical wrist pin bearings seated in undercut arcuate recesses provided in the bifurcated upper end of the rod and lower end of a section depending from the piston crown, the bearings being journaled adjacent their ends in aligned bores provided in the skirt side walls. A modification shows a wick-type wiper ring carried by the piston between the adjacent ends of its ring belt section and skirt side walls.

Background of the invention

The invention relates to pistons having separate head and skirt portions, and particularly to improved means for retaining them and the connecting rod in assembly.

While separate head and skirt type pistons have been proposed heretofor, as represented by such U.S. patents as Nos. 1,787,119 to Noble and 2,315,403 to Dillon, they have all been characterized by the head having two depending bosses or projections straddling the upper end of the connecting rod and a wrist pin extending through aligned bores in said projections, skirt and rod. I have found that a much simpler and lighter weight construction, can be used which has important advantages in providing greater utilization of the wrist pin bearing area in transmitting engine power and compression stroke forces from the piston head to the connecting rod.

Summary of the invention

In accordance with my invention only the piston skirt need be provided with bores for the wrist pin, and the separate head portion has a section extending downwardly from the crown between the bored side walls of the skirt. The piston head and skirt portions are retained in assembly by a part-cylindrical insert bearing for the wrist pin, which bearing journals in the skirt bores and is seated and retained by an under-cut arcuate recess povided in the bottom of the section depending from crown. The connecting rod may be similarly connected to the piston skirt by terminating the rod with a bifurcated upper end and providing a like arcuate recess therein with undercut sides for retention by a second part-cylindrical bearing journaled in the skirt bores. Internal cooling of the piston may be provided by drilled passages in the rod for conducting engine lubricating oil under pressure to one or more oil jets in the bifurcated end of the rod from which the oil is directed upwardly against the piston crown and ring belt.

Description of the preferred embodiments

Figure 1:
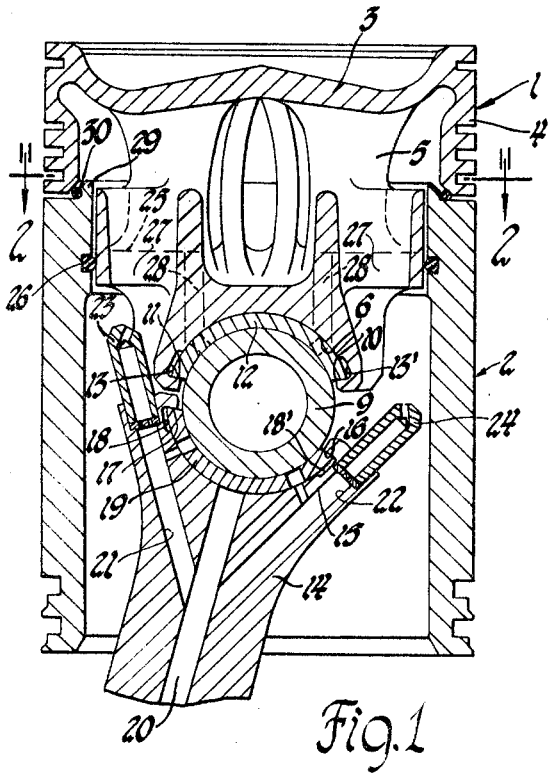
FIGURE 1 is a view in longitudinal section through a piston, connecting rod and wrist pin assembly embodying my invention.
Figure 2:
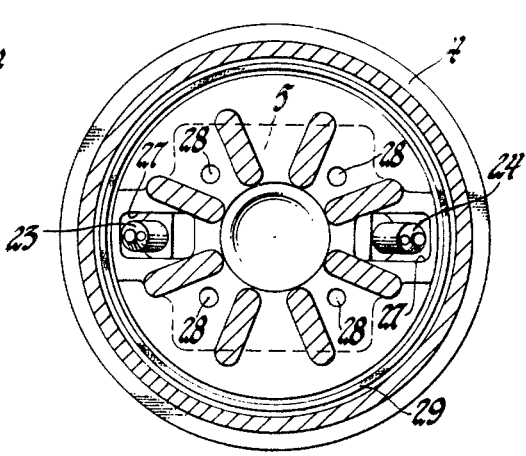
FIGURE 2 is a transverse sectional view taken in the direction of the arrows and along the line 2—2 of FIGURE 1.
Figure 3:
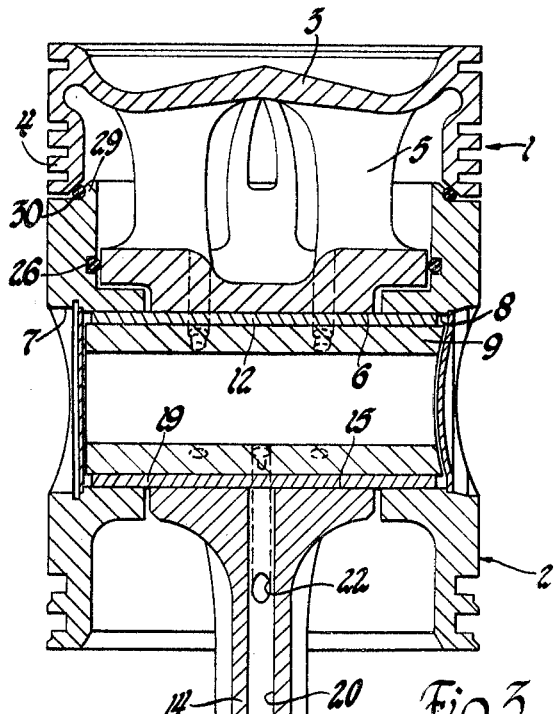
FIGURE 3 is a view in longitudinal section at right angles to the view in FIGURE 1.

Referring to the drawing, and first to FIGURES 1–3, a piston is shown having separate head and skirt portions designated generally by the numerals 1 and 2, respectively. The head includes a crown section 3 and integral outer ring belt 4, and depending from the crown 3 is an inner depending section 5 extending downwardly within the skirt and terminating in an arcuate recess 6. The skirt portion 2 is generally cylindrical in shape, as shown, and has the usual aligned bores 7 and 8 in its side walls for reception of the wrist pin 9. The recess 6 is generally concentric with the bores 7 and 8, and is open at its opposite ends facing those bores. This recess terminates circumferentially of the wrist pin axis in shoulders 10 and 11 which extend generally radially toward the wrist pin axis, or at an angle somewhat more acute as desired, to provide a definite undercut relative to the circumference of the skirt bores 7 and 8. Retention of the piston head and skirt portions in assembly is effected by insertion of a part-cylindrical wrist pin bearing 12 through one or the other of the bores 7, 8, thence endwise through the recess 6 and into the opposite bore of the skirt. With the bearing thus inserted, the outer diameter surface of the bearing is rotatably journaled adjacent its ends in the skirt bores and non-rotatably seated intermediate its ends in the recess. Also, it is of sufficient circumferential extent that its sides abut the recess shoulders 10 and 11. Where desired to effect a press fit of the bearing in the recess, the depth of the recess is enlarged slightly adjacent the shoulders 10 and 11 as shown at 13 and 13' to accommodate some radial expansion in those areas of the sides of the bearing.

The connecting rod 14 may be similarly retained in assembly with the piston skirt by terminating its upper end in a bifurcation formed with a like undercut arcuate recess 15 generally concenric with the skirt bores 7 and 8. This rod end recess, as shown, has similar generally radially extending shoulders 16 and 17, and may be relieved adjacent thereto at 18 and 18' to accommodate radial expansion in those areas of the sides of a similarly press fitted part-cylindrical bearing 19. This bearing is inserted endwise through one of the skirt bores 7, 8 in the same manner as the upper bearing 12, and when in place it journals adjacent its ends in the skirt bores and seats intermediately its ends in the rod end recess 15. The wrist pin 9 is then inserted endwise and journals on the inner diameter surfaces of both bearings.

Figure 4:
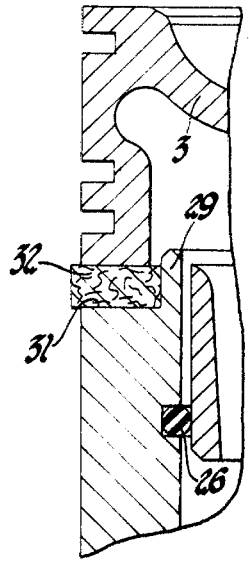
FIGURE 4 is a fragmentary view similar to FIGURE 1 but showing a modification.

To provide for internal cooling of the piston, the connecting rod is provided with a longitudinally cored or drilled passage 20 terminating in one or more openings 21, 22 in the upper end of the rod. As shown these rod openings are disposed laterally of the wrist pin so that when oil is supplied under pressure to the passage 20 from the engine lubricating system (not shown) streams of oil are directed upwardly toward the piston crown section 3. Nozzle devices 23 and 24 may be installed in the rod openings 21 and 22 to more effectively direct the cooling oil flow within the piston. In order to trap some of this oil within the head portion for better scrubbing action and resultant heat transfer from the crown 3 and ring belt 4, a dam is provided in the form of a flange 25 integral with the inner depending section 5 of the crown. This flange extends radially outward within the skirt portion of the piston above the wrist pin and is sealed to the skirt walls by a gasket ring 26. Openings 27 are provided in this flange for passage of the cooling oilstreams from the nozzles 23, 24, and smaller drain passes 28 return the oil to openings in the bearing 12 for lubricating the wrist pin 9. Additional sealing of the piston head portion to the skirt is shown provided by a flange 29 on the skirt which extends within the ring belt and serves to retain a second gasket ring 30. Where lubrication of an upper portion of the cylinder wall for the piston is desired, this latter sealing feature may be modified in accordance with the construction shown in FIGURE 4. In this design the upper end of the skirt is provided with a recess 31 facing the underside of the ring belt, and a wick-type lubricating ring 32 of felt-like material is retained therein.

The piston and connecting rod construction of my invention not only has all the advantages inherent in a separate and floating crown type piston, of relieving the ring belt of high lateral thrust forces, enabling the skirt portion to be made of light-weight material and reducing the required diametral clearance of the skirt in the cylinder bore, but additionally makes it possible to increase the effective bearing area at the wrist pin for transmission of gas pressure forces from the piston to the rod.

I claim:

1. In a piston having a head portion including a crown section with integral outer ring belt and inner wrist pin connecting section depending therefrom, and a separate skirt portion having side walls surrounding said inner depending section of the head portion, said walls having aligned bores for reception of wrist pin bearings, said inner depending section terminating in an arcuate recess generally concentric with said bores, said recess terminating circumferentially in generally radially extending shoulders and being open at its end facing said bores, whereby retention of said head and skirt portions in assembly may be effected by insertion of a part-cylindrical wrist pin bearing having an outer diameter to fit said bores and recess and of arcuate extent to abut said shoulders.

2. A piston in accordance with claim 1, wherein the radius of said recess is enlarged slightly adjacent said shoulders to accommodate radial expansion of the arcuate extremities of said wrist pin bearing when press-fitted into said recess.

3. A piston in accordance with claim 1, wherein one of said ring belt section and the adjacent end of said skirt portion is provided with an external annular recess, and a ring adapted to have wiping engagement with a cylinder wall is seated in said recess.

4. A piston in accordance with claim 1, in combination with a connecting rod, said rod having an end terminating within the skirt portion in an arcuate recess, said rod end recess being generally concentric with said bores, open at its ends and terminating circumferentially in generally radially extending shoulders, and part-cylindrical wrist pin bearings seated intermediately their ends in said recesses with their sides abutting said shoulders and their ends journaled in said bores.

5. A piston in accordance with claim 1, wherein said inner depending section has an annular flange extending radially outwardly within the skirt portion, and a sealing ring is interposed between said flange and side walls of the skirt portion.

6. A piston in accordance with claim 5, wherein the skirt portion has a flange projecting within said ring belt section of the head portion, and a sealing ring is interposed between said skirt portion flange and said ring belt section.

7. A piston in accordance with claim 6, in combination with a connecting rod terminating with a bifurcated end within the piston skirt portion, said end having an arcuate recess generally concentric with said bores, said rod end recess being open at its ends facing said bores and terminating circumferentially in generally radially extending shoulders, part-cylindrical bearings seated intermediately their ends in said recesses with their sides abutting said shoulders and their ends journaled in said bores, a wrist pin journaled in said bearings and said rod having a longitudinally extending passage therein terminating in an opening in said bifurcated end on one side of said wrist pin for directing lubricating oil upwardly toward the piston crown section.

References Cited

UNITED STATES PATENTS

| | | | |
|---|---|---|---|
| 1,787,119 | 12/1930 | Noble | 92—160 |
| 2,315,403 | 3/1943 | Dillon | 92—190 |
| 2,742,883 | 4/1956 | Smith | 92—157 X |

CARROLL B. DORITY, JR., *Primary Examiner.*

U.S. Cl. X.R.

92—160, 190